United States Patent
Yang et al.

(10) Patent No.: US 10,425,839 B2
(45) Date of Patent: Sep. 24, 2019

(54) METHODS AND DEVICES FOR USING UNLICENSED CARRIER RESOURCE

(71) Applicant: ZTE Corporation, Shenzhen (CN)

(72) Inventors: Li Yang, Shenzhen (CN); Wei Gou, Shenzhen (CN); Yajun Zhao, Shenzhen (CN); Zhisong Zuo, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 15/546,902

(22) PCT Filed: Aug. 26, 2015

(86) PCT No.: PCT/CN2015/088178
§ 371 (c)(1),
(2) Date: Jul. 27, 2017

(87) PCT Pub. No.: WO2016/119454
PCT Pub. Date: Aug. 4, 2016

(65) Prior Publication Data
US 2018/0035311 A1      Feb. 1, 2018

(30) Foreign Application Priority Data

Jan. 27, 2015   (CN) .......................... 2015 1 0041858

(51) Int. Cl.
*H04W 16/32*      (2009.01)
*H04W 72/04*      (2009.01)
(Continued)

(52) U.S. Cl.
CPC ........... *H04W 16/32* (2013.01); *H04W 16/14* (2013.01); *H04W 72/042* (2013.01);
(Continued)

(58) Field of Classification Search
CPC ............................ H04W 16/32; H04W 16/14; H04W 72/0413; H04W 72/042
See application file for complete search history.

(56) References Cited

U.S. PATENT DOCUMENTS

2011/0300854 A1*  12/2011  Shan ................... H04L 1/1887
                                                                          455/422.1
2012/0140708 A1*   6/2012  Choudhury ......... H04W 72/082
                                                                          370/328
(Continued)

FOREIGN PATENT DOCUMENTS

| CN | 102256258 A   | 11/2011 |
| CN | 103609162 A   | 2/2014  |
| WO | 2014186932 A1 | 11/2014 |

OTHER PUBLICATIONS

International Search Report for corresponding application PCT/CN2015/088178 filed on Aug. 26, 2015; dated Dec. 1, 2015.

*Primary Examiner* — Brandon M Renner
*Assistant Examiner* — Jay L Vogel
(74) *Attorney, Agent, or Firm* — Cantor Colburn LLP

(57) ABSTRACT

Methods and devices for using an unlicensed carrier resource are provided. In a method for using an unlicensed carrier resource, an eNode B (eNB) receives indication information reported by a User Equipment (UE), where the indication information is used for indicating that a local Secondary Cell (Scell) of the UE is idle; upon a trigger of the indication information, the eNB detects whether a local Scell of the eNB is idle or not; and the eNB judges, according to a detection result, whether or not to use an unlicensed carrier resource which has been occupied by the UE.

18 Claims, 9 Drawing Sheets

(51) Int. Cl.
*H04W 16/14* (2009.01)
*H04L 5/00* (2006.01)
*H04W 88/02* (2009.01)
*H04W 76/15* (2018.01)
*H04W 76/34* (2018.01)
*H04W 72/12* (2009.01)

(52) U.S. Cl.
CPC ......... *H04W 72/0413* (2013.01); *H04L 5/001* (2013.01); *H04L 5/0055* (2013.01); *H04W 72/1284* (2013.01); *H04W 76/15* (2018.02); *H04W 76/34* (2018.02); *H04W 88/02* (2013.01)

(56) References Cited

U.S. PATENT DOCUMENTS

| | | | | |
|---|---|---|---|---|
| 2013/0301586 | A1* | 11/2013 | Fan | H04L 1/0073 370/329 |
| 2013/0343322 | A1* | 12/2013 | Lee | H04B 7/2656 370/329 |
| 2014/0071931 | A1* | 3/2014 | Lee | H04L 5/001 370/329 |
| 2014/0295909 | A1* | 10/2014 | Ouchi | H04W 52/242 455/522 |
| 2015/0215100 | A1* | 7/2015 | Jeon | H04L 5/0062 370/252 |
| 2016/0066195 | A1* | 3/2016 | Moon | H04W 16/14 455/454 |
| 2017/0111913 | A1* | 4/2017 | Li | H04W 72/04 |

* cited by examiner

METHODS AND DEVICES FOR USING UNLICENSED CARRIER RESOURCE

TECHNICAL FIELD

The disclosure relates to the field of communications, and in particular to methods and devices for using an unlicensed carrier resource.

BACKGROUND

FIG. 1 is a diagram showing system architecture of a Long Term Evolution (LTE) system in a 3rd Generation Partnership Project (3GPP) cellular mobile system. The LTE system includes: a Mobility Management Entity (MME) and a Serving Gate Way (SGW) on a core network side, and User Equipment (UE) (also called as a terminal) and a base station (for example, an eNode B (eNB)) on a radio access network side. An interface between UE and eNB is Uu air interface (or called as air interface for short). An S1 interface is an interface between an eNB and a packet core network, where S1 for the control plane (also called as S1-MME for short) is an interface between the eNB and the MME, while an S1-User plane (S1-U) interface is an interface between the eNB and the SGW. An S11 interface is an interface between the MME and the SGW. An X2 interface is an interconnecting interface between eNBs. An X2-User plane (X2-U) interface and an X2-Control plane (X2-C) interface are interfaces between eNBs.

FIG. 2 to FIG. 5 are schematic diagrams of control plane and user plane protocol stack architectures between a UE, eNB and core network (an MME and an SGW) in an LTE system and a control plane and user plane protocol stack architecture between eNBs in an LTE system. An S1 interface is an interface between the eNB and a packet core network. An X2 interface is an interconnecting interface between eNBs. A Media Access Control (MAC) layer mainly provides data transmission for an upper-layer logical channel, and is responsible for allocating Uplink (UL) and Downlink (DL) radio resources to realize functions such as a Hybrid Automatic Repeat Request (HARQ), scheduling, priority processing, Multiplexing (MUX) and the like. A Physical (PHY) layer mainly provides PHY related signal processing, transmission means and air interface signal conversion for a MAC Protocol Data Unit (PDU) of a data packet from a transmission channel. In addition, an upper protocol Radio Link Control (RLC) layer of a Uu air interface mainly provides fragmentation and retransmission service for user and control data. A Packet Data Convergence Protocol (PDCP) layer mainly completes transmission of user data for an upper layer of user plane or Radio Resource Control (RRC). An RRC layer mainly completes broadcast, paging, RRC connection management, radio bearer control, a mobility function, terminal measurement reporting and control and the like. The abovementioned contents may all be queried in a public 3GPP website. The STCP in FIG. 2 is an abbreviation of Scalable Transmission Control Protocol (TCP), and the GTP is an abbreviation of General Packet Radio Service Tunneling Protocol.

Before Release-10 (Rel-10) of an LTE system, a UE and an eNB may perform UL and DL communication only within a cell configured on one licensed carrier to implement data sending and receiving on the single licensed carrier. In this situation, the eNB may configure only one serving cell for the UE. From Rel-10 of the LTE system, for increasing a peak rate of the UE, radio resources between multiple licensed carrier cells may be dynamically collaborated and utilized, and the UE and the eNB may perform UL and DL communication within cells configured on multiple licensed carriers to implement data sending and receiving on the multiple licensed carriers. In this situation, the eNB may configure multiple serving cells for the UE, including a Primary Cell (Pcell) (a single serving cell bearing Physical Uplink Control Channel (PUCCH) feedback) and multiple Secondary Cells (Scells) (serving cells at least supporting Physical Downlink Shared Channel/Physical Uplink Shared Channel (PDSCH/PUSCH) data transmitted). This is an LTE Carrier Aggregation (CA) technology. However, the LTE CA technology is temporarily limited to aggregation of licensed carriers, a UE supports aggregation of at most 5 licensed carriers, and a maximum aggregate bandwidth is 5×20 M=100 M.

Since licensed carrier resources in a licensed band of an LTE system are relatively deficient (operating companies need to competitively bid for purchasing) and homogenous deployment networking of macro cells under a macro eNB cannot meet an increasing requirement of an LTE user on heavy service traffic, an LTE operating company is expected to develop and utilize unlicensed carrier resources in an unlicensed band (operating companies do not need to competitively bid for purchasing and multiple operating companies can freely compete for preemption and use the unlicensed carrier resources), and homogenous deployment networking of micro cells under a micro eNB or a Lower Power Node (LPN) is expected to be adopted for coverage of a service hotspot, such as a region with a dense population flow. FIG. 6 is a schematic diagram of configuring two macro cells which have roughly the same UL and DL radio coverage and are located on two different adjacent licensed carriers in the same licensed band respectively for a CA operation. A UE may simultaneously perform UL and DL communication with the macro cells on the two licensed carriers within effective coverage to implement data sending and receiving on the double licensed carriers. In FIG. 7, two LPN micro cells are added on the basis of FIG. 6, and the two LPN micro cells are located on two different unlicensed carriers in an unlicensed band respectively, and keep timing synchronization with the two macro cells in FIG. 6 by ground optical fiber collaboration. The macro cells on the two licensed carriers and the micro cells on the two unlicensed carriers may theoretically be configured for the CA operation together, and the UE may simultaneously perform UL and DL communication with the macro cells on the two licensed carriers and the micro cells on the two unlicensed carriers within effective coverage to implement data sending and receiving on multiple carriers.

FIG. 8 is a working architecture of pure licensed CA of LTE. When an eNB or a UE serves as a sender, N parallel HARQ entities may be configured in a MAC entity, and N HARQ data packets (or called as MAC PDUs) generated under a specific Transmission Time Interval (TTI) are finally converted into LTE specific physical waveform signals after a series of related processing (for example, channel coding, modulation and resource block adaption mapping) of a PHY entity and the LTE specific physical waveform signals are sent on N licensed carriers. A UE or eNB serving as a receiver performs reverse processing through the MAC/PHY entity. Here, a single Pcell and N−1 Scells are all configured on the licensed carriers.

FIG. 9 is a working architecture of unlicensed CA of LTE. When an eNB or a UE serves as a sender, N parallel HARQ entities are configured in a MAC entity, where some of the N parallel HARQ entities are conventional HARQ entities serving licensed carriers (the same as the HARQ entities in FIG. 8), while the others are U-HARQ entities serving unlicensed carriers (transformation and enhancement may need to be performed on the conventional HARQ entities for characteristics of the unlicensed carriers). N generated HARQ data packets (or called as MAC PDUs) are finally converted into LTE specific physical waveform signals after a series of related processing (for example, channel coding, modulation and resource block adaption mapping) of a PHY entity, where some of the LTE specific physical waveform signals are sent on the licensed carriers, while the others are sent on the unlicensed carriers. Similarly, the PHY and Unlicensed PHY (U-PHY) entities are distinguished here to identify differences from a conventional PHY entity. Here, there is still a single Pcell on a licensed carrier and a plurality of Scells on the licensed carriers, as well as a plurality of Unlicensed Scells (U-Scells) on the unlicensed carriers.

Since resources on an unlicensed carrier are randomly shared by multiple eNBs/Wireless Fidelity (WIFI) Access Points (APs) of multiple same operating companies/different operating companies in a certain PHY local region, each eNB monitors a busy or idle state of a detection channel in a Listen Before Talk (LBT) manner, and then tries to preempt the channel resources on the unlicensed carrier. For example, in the same serving region, an eNB1 of an operating company 1 configures CA as Pcell1+U-Scell for UE1 under the eNB1, and an eNB2 of an operating company B configures CA as Pcell2+U-Scell for UE2 under the eNB2. The Pcell1 and Pcell2 are located on respective licensed carriers of the operating company A/B respectively, and have no interference conflicts and channel resource sharing problems. However, the U-Scells are located on the same unlicensed carrier, and under this condition, every time when the respective eNBs of the operating company A/B are intended to send data, whether the unlicensed carrier is occupied by another eNB/WIFI AP/UE and the like or not may need to monitored first. For example, when received energy, detected by executing Clear Channel Assessment (CCA) by the eNB1 at a certain periodic time, on a full bandwidth of the unlicensed carrier is more than a certain threshold, it represents that the unlicensed carrier has been occupied at the present moment, and the eNB1 may not preempt a channel resource on the unlicensed carrier, otherwise strong interference to the other node may be formed. Thereafter, the eNB1 usually waits for a period of time (back-off time), and the eNB1 executes CCA detection of a next round to try to preempt the resource on the unlicensed carrier again at a next specific time. When the received energy, detected by executing CCA detection by the eNB1, on the full bandwidth of the unlicensed carrier is lower than a certain threshold, it represents that the unlicensed carrier is idle at the present moment, and the eNB1 may independently occupy a period of Channel Occupancy Time (COT) for Physical Downlink Control Channel (PDCCH) UL and DL scheduling and PDSCH data block sending or PUSCH data block receiving similar to those on a licensed carrier, and then may release the occupied unlicensed carrier channel resources.

In a radio environment where multiple nodes such as eNBs/WIFI Aps/UEs of the same/different operating companies in the same local region complicatedly coexist, the eNBs may successfully preempt local unlicensed carrier channel resources and execute DL data block scheduling, but it does not mean that the UE can certainly reliably receive. This is because there may exist some hidden nodes around the receiving UE, these hidden nodes may not be able to perceive certain reserve signals of the sending eNB (their CCA detection results for local surroundings also indicate an idle state of the detection channel), various transmitted signals of these hidden nodes may also not be strongly perceived by the sending eNB but may form strong receiving conflict interference to the receiving UE, and the UE may hardly correctly demodulate data blocks from the serving eNB. As shown in FIG. 10, after an eNB successfully preempts an unlicensed carrier channel resource and sends PDCCH DL scheduling and a PDSCH data block, a UE may not correctly receive and demodulate the PDSCH data block due to existence of strong interference (a part shown by the ellipse in FIG. 10) of a hidden node on a UE side, and then feeds back a receiving and demodulation failure Negative Acknowledgement (NACK) through a PUCCH on a licensed carrier after a specific time period. Therefore, for implementing DL data block transmission of a relatively high success rate, a relatively safe method is as follows. When a sending eNB successfully preempts local unlicensed carrier channel resources, a receiving UE can also preempt and occupy local unlicensed carrier channel resources at the same time, so as to form resource protection on both sending and receiving parties. Similarly, for implementing UL data block transmission of a relatively high success rate, a relatively safe method is as follows. When a sending UE successfully preempts local unlicensed carrier channel resources, a receiving eNB can also occupy local unlicensed carrier channel resources all the time (which is still implemented by locally sending a certain reserve signal, as shown in FIG. 11). According to a related technology, for example, during DL transmission, in order to avoid potential strong interference of a hidden node on a UE side, an eNB may send a certain DL collision probe command or another similar pre-scheduling-driven auxiliary signal before a DL data block is formally scheduled, a UE starts performing CCA detection on a local radio environment after receiving the probe command until it is detected by CCA detection that a local unlicensed carrier channel resource of the UE is idle, and then the UE may give an UL feedback to notify the eNB that the UE side has gotten ready to reliably receive the DL data block. Thereafter, the eNB starts normal DL scheduling and data block sending only after determining that there is no strong interference of the hidden node on the UE side. Such a collaboration manner requires the eNB/UE to perform advance collision probe and feedback loopback for one time or many times before each formal data packet transmission, and also requires the sending eNB to reserve and occupy the local unlicensed carrier channel resource for a long time during conflict probe loopback (for preventing the unlicensed channel resource of the sending eNB from being preempted by another competitive node). Such a manner may require relatively large amount of control signaling, and may have large resource overhead waste and data packet scheduling delay.

For the problem of relatively large resource waste and data packet delay caused by the fact that an eNB/UE may need to perform conflict probe and feedback loopback for many times and the eNB may need to reserve and occupy a local unlicensed carrier channel resource for a long time during conflict probe loopback, there is yet no effective solution.

SUMMARY

Some exemplary embodiments of the disclosure provide methods and devices for using an unlicensed carrier resource, which can solve the problem.

According to an exemplary embodiment of the disclosure, a method for using an unlicensed carrier resource is provided, which may include the following acts. An eNB receives indication information reported by a UE, and the indication information may be used for indicating that a local Scell of the UE is idle. Upon a trigger of the indication information, the eNB detects whether a local Scell of the eNB is idle or not. The eNB judges, according to a detection result, whether or not to use an unlicensed carrier resource which has been occupied by the UE.

In an exemplary embodiment, the act that the eNB receives the indication information reported by the UE may include at least one of the following acts. The eNB receives specified PUCCH resource information reported by the UE, and the specified PUCCH resource information may carry the indication information. The eNB receives Channel State Information (CSI) reported by the UE, and when the CSI is a preset value, the preset value may serve as the indication information. The eNB receives a pseudo Acknowledgement (ACK) sequence, reported by the UE, of a DL pseudo data block of the Scell of the UE, and the pseudo ACK sequence may carry the indication information.

In an exemplary embodiment, the act that the eNB receives the specified PUCCH resource information reported by the UE may include the following act. The eNB receives Uplink Control Information (UCI) reported by the UE, and the UCI may include a control domain byte dedicated to carrying the indication information.

In an exemplary embodiment, the act that the eNB judges, according to the detection result, whether or not to use the unlicensed carrier resource which has been occupied by the UE may include the following acts. When the detection result indicates that the local Scell of the eNB is idle, it is judged that the UE continues occupying the unlicensed carrier resource. When the detection result indicates that the local Scell of the eNB is not idle, it is judged that the UE releases the unlicensed carrier resource which the UE previously occupies.

In an exemplary embodiment, after the act that it is judged that the UE releases the unlicensed carrier resource which the UE previously occupies, the method may further include the following act. The eNB sends Downlink Control Information (DCI) carrying a dedicated control domain byte to the UE, and the UE may release, under indication of the DCI carrying the dedicated control domain byte, the unlicensed carrier resource which the UE previously occupies.

According to another exemplary embodiment of the disclosure, a method for using an unlicensed carrier resource is also provided, which may include the following acts. When a local Scell of a UE is idle, the UE sends indication information for indicating that the local Scell of the UE is idle to an eNB. After the eNB judges, according to the indication information, whether or not to use an unlicensed carrier resource which has been occupied by the UE, the UE receives control information transmitted by the eNB, and the control information may be used for controlling whether or not the UE uses the unlicensed carrier resource which has been occupied by the UE.

In an exemplary embodiment, the act that the UE sends the indication information to the eNB may include at least one of the following acts. The UE sends specified PUCCH resource information to the eNB, and the specified PUCCH resource information may carry the indication information. The UE sends CSI to the eNB, and when the CSI is a preset value, the preset value may serve as the indication information. The UE sends a pseudo ACK sequence of a DL pseudo data block of the Scell of the UE to the eNB, and the pseudo AC sequence may carry the indication information.

In an exemplary embodiment, the act that the UE sends the specified PUCCH resource information to the eNB may include the following act. The UE sends UCI to the eNB, and the UCI may include a control domain byte dedicated to carrying the indication information.

In an exemplary embodiment, when the UE sends the indication information for indicating that the local Scell of the UE is idle to the eNB, the UE may send a reserve signal which may indicate that the UE is currently occupying the unlicensed carrier resource.

In an exemplary embodiment, the method may further include the following act. The UE sends, in the local Scell of the UE, a PUSCH data block which is controlled by no UL scheduling information of the eNB, and demodulation information used for the eNB to demodulate the PUSCH data block may be fed back to the eNB through a PUCCH of a licensed carrier.

According to another exemplary embodiment of the disclosure, a device for using an unlicensed carrier resource is further provided, which may be applied to an eNB and include a receiving module, a detection module and a judgment module. The receiving module is configured to receive indication information reported by a UE, where the indication information may be used for indicating that a local Scell of the UE is idle. The detection module is configured to, upon a trigger of the indication information, detect whether a local Scell of the eNB is idle or not. The judgment module is configured to judge, according to a detection result, whether or not to use an unlicensed carrier resource which has been occupied by the UE.

In an exemplary embodiment, the receiving module may further be configured to receive specified PUCCH resource information reported by the UE, where the specified PUCCH resource information may carry the indication information; and/or receive CSI reported by the UE, when the CSI is a preset value, the preset value may serve as the indication information; and/or receive a pseudo ACK sequence, reported by the UE, of a DL pseudo data block of the Scell of the UE, where the pseudo ACK sequence may carry the indication information.

In an exemplary embodiment, the receiving module may further be configured to receive UCI reported by the UE, and the UCI may include a control domain byte dedicated to carrying the indication information.

In an exemplary embodiment, the judgment module may include a first judgment unit and a second judgment unit. The first judgment unit is configured to, when the detection result indicates that the local Scell of the eNB is idle, judge that the UE continues occupying the unlicensed carrier resource. The second judgment unit is configured to, when the detection result indicates that the local Scell of the eNB is not idle, judge that the UE releases the unlicensed carrier resource which the UE previously occupies.

In an exemplary embodiment, the second judgment unit may include a sending subunit. The sending subunit is configured to send DCI carrying a dedicated control domain byte to the UE, and the UE may release, under indication of the DCI carrying the dedicated control domain byte, the unlicensed carrier resource which the UE previously occupies.

According to another exemplary embodiment of the disclosure, a device for using an unlicensed carrier resource is also provided, which may be applied to a UE and include a sending module and a receiving module. The sending module is configured to, when a local Scell of the UE is idle, send indication information for indicating that the local Scell of the UE is idle to an eNB. The receiving module is configured to, after the eNB judges, according to the indication information, whether or not to use an unlicensed carrier resource which has been occupied by the UE, receive control information transmitted by the eNB, where the control information may be used for controlling whether or not the UE uses the unlicensed carrier resource which has been occupied by the UE.

In an exemplary embodiment, the sending module may be configured to send specified PUCCH resource information to the eNB, where the specified PUCCH resource information may carry the indication information; and/or send CSI to the eNB, where when the CSI is a preset value, the preset value may serve as the indication information; and/or send a pseudo ACK sequence of a DL pseudo data block of the Scell of the UE to the eNB, where the pseudo AC sequence may carry the indication information.

In an exemplary embodiment, the sending module may further be configured to send UCI to the eNB, where the UCI may include a control domain byte dedicated to carrying the indication information.

According to some exemplary embodiments of the disclosure, the eNB judges whether the local Scell of the eNB is idle or not to further judge whether or not to use the unlicensed carrier resource which has been occupied by the UE when the UE actively reports that the local Scell of the UE is idle. The problem of relatively large resource waste and data packet delay caused by the fact that the eNB/UE may need to perform conflict probe and feedback loopback for many times and the eNB may need to idly reserve and occupy a local unlicensed carrier channel resource for long even with waste during conflict probe loopback is solved. In addition, unnecessary resource overhead is avoided, the data packet scheduling delay is also reduced, and meanwhile, strong interference of a hidden node on a UE side is avoided to a certain extent.

DETAILED DESCRIPTION OF THE EMBODIMENTS

Other characteristics and advantages of the disclosure will be elaborated in the following specification, and moreover, partially become obvious from the specification or are understood by implementing the disclosure. A purpose and other advantages of the disclosure may be achieved and obtained through structures specially pointed out in the specification, the claims and the drawings.

In order to make the solutions of the disclosure better understood by those skilled in the art, the solutions in the exemplary embodiments of the disclosure will be clearly and completely described below with reference to the drawings in the exemplary embodiments of the disclosure. Obviously, the described exemplary embodiments are not all exemplary embodiments but only part of the exemplary embodiments of the disclosure. All other exemplary embodiments obtained on the basis of the exemplary embodiments in the disclosure by those skilled in the art without creative work shall fall within the scope of protection defined by the appended claims of the disclosure.

Figure 1:
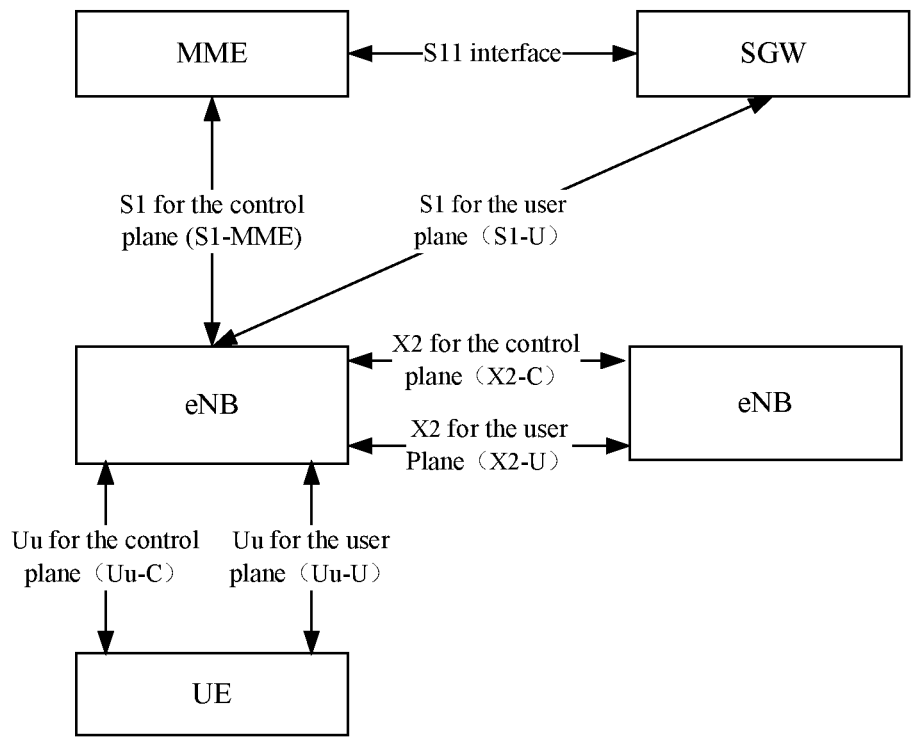
FIG. 1 is a schematic diagram of an LTE system architecture according to the related technology.
Figure 2:
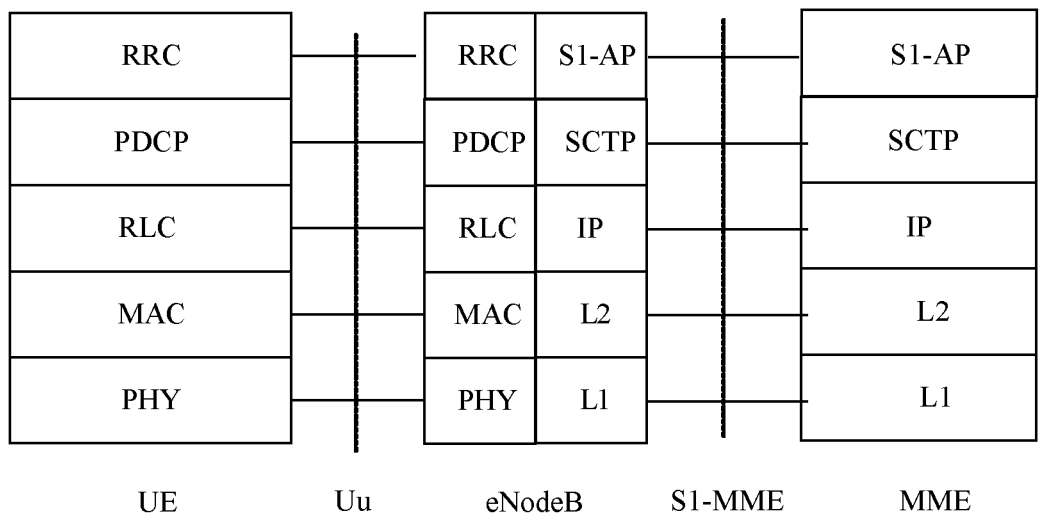
FIG. 2 is a schematic diagram of a control plane architecture of an LTE Uu/S1 interface according to the related technology.
Figure 3:
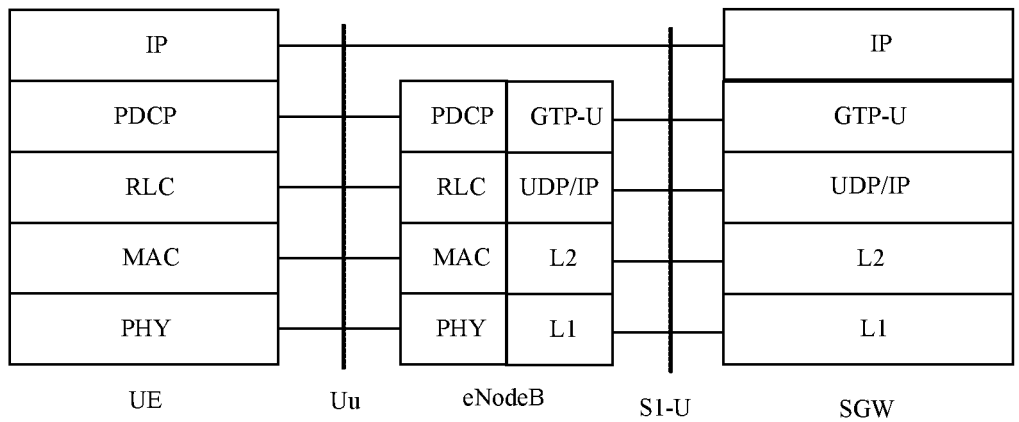
FIG. 3 is a schematic diagram of a user plane architecture of an LTE Uu/S1 interface according to the related technology.
Figure 4:
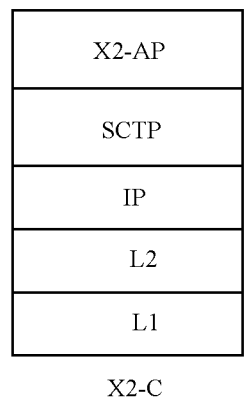
FIG. 4 is a schematic diagram of a control plane architecture of an LTE X2 interface according to the related technology.
Figure 5:
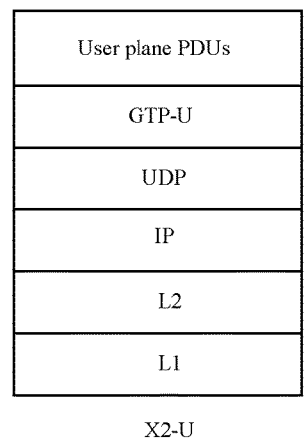
FIG. 5 is a schematic diagram of a user plane architecture of an LTE X2 interface according to the related technology.
Figure 6:
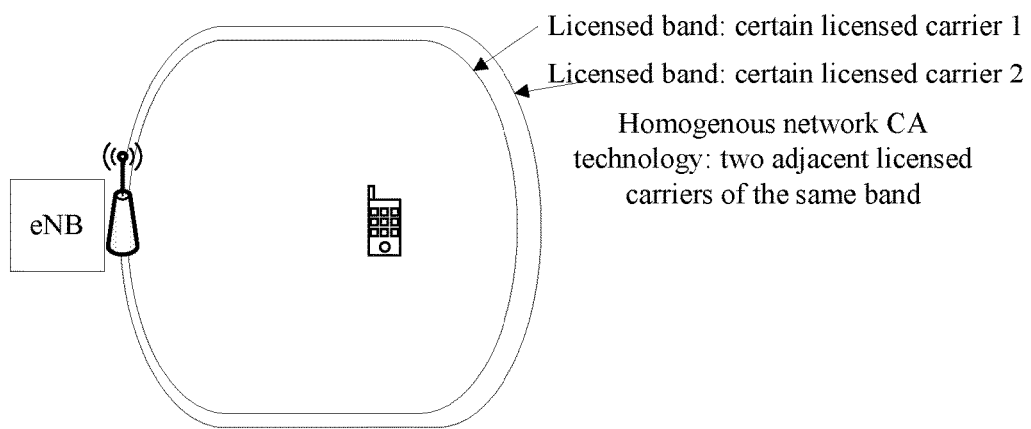
FIG. 6 is a schematic diagram of licensed CA of LTE according to the related technology.
Figure 7:
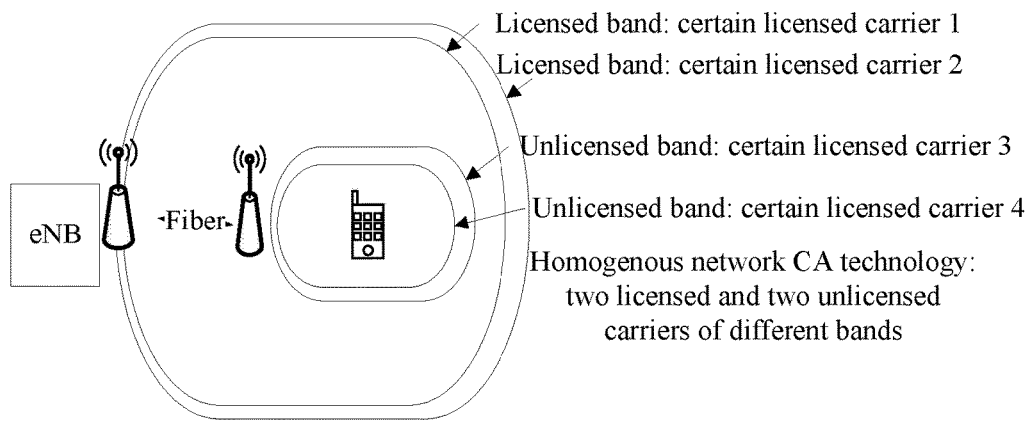
FIG. 7 is a schematic diagram of unlicensed CA of LTE according to the related technology.
Figure 8:
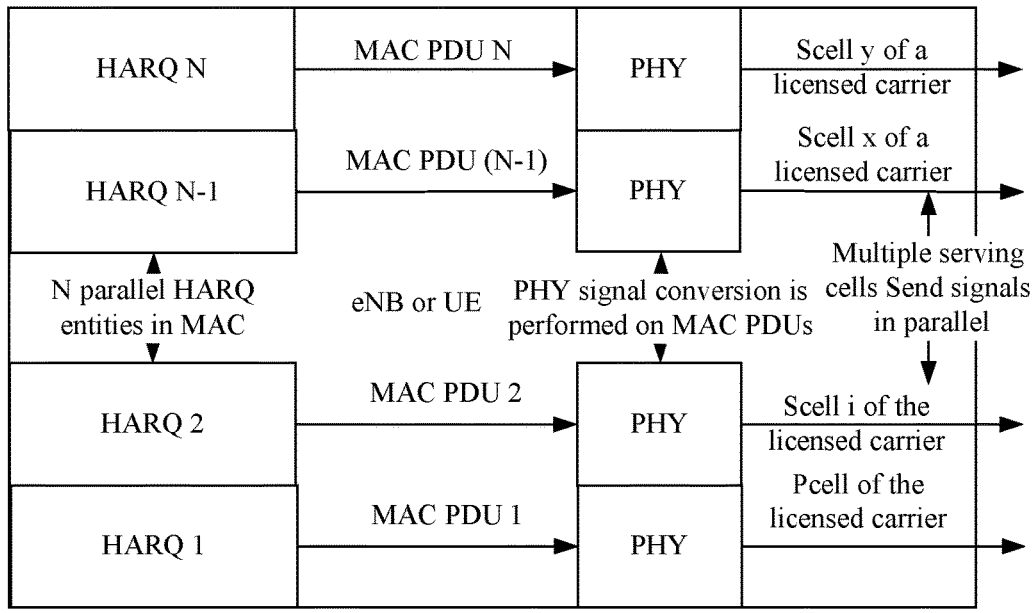
FIG. 8 is a schematic diagram of a working architecture of pure licensed CA of LTE according to the related technology.
Figure 9:
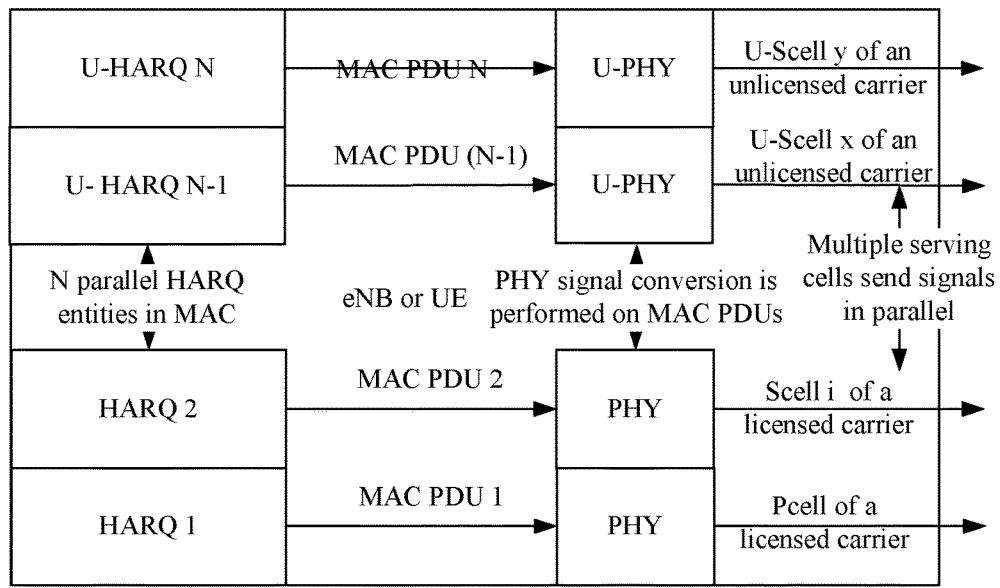
FIG. 9 is a schematic diagram of a working architecture of unlicensed CA of LTE according to the related technology.
Figure 10:
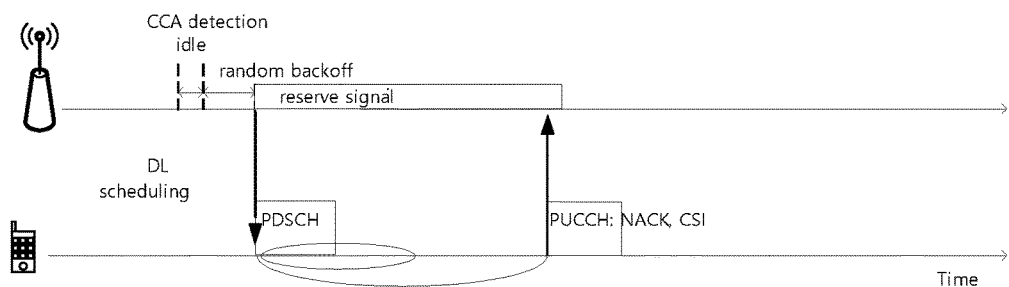
FIG. 10 is a schematic diagram of a DL scheduling and sending success and a receiving conflict failure according to the related technology.
Figure 11:
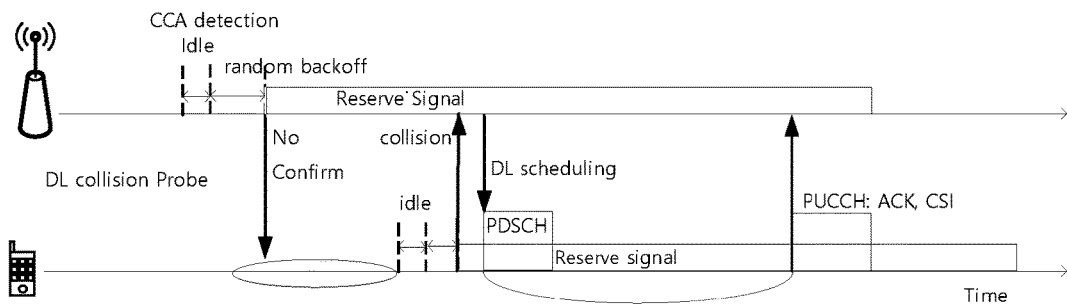
FIG. 11 is a schematic diagram of DL scheduling and sending and resource protection of a receiving party according to the related technology.
Figure 12:
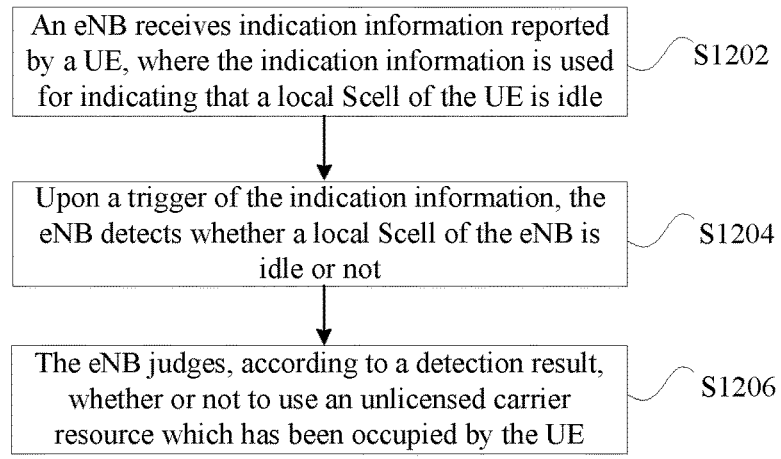
FIG. 12 is a flowchart of a method for using an unlicensed carrier resource according to an exemplary embodiment of the disclosure.

In order to solve the problem, an exemplary embodiment provides a method for using an unlicensed carrier resource. FIG. 12 is a flowchart of a method for using an unlicensed carrier resource according to an exemplary embodiment of the disclosure. As shown in FIG. 12, the method includes the following acts.

At act S1202, an eNB receives indication information reported by a UE, and the indication information is used for indicating that a local Scell of the UE is idle.

At act S1204, upon a trigger of the indication information, the eNB detects whether a local Scell of the eNB is idle or not.

At act S1206, the eNB judges, according to a detection result, whether or not to use an unlicensed carrier resource which has been occupied by the UE.

By the above acts, the eNB judges whether the local Scell of the eNB is idle or not to further judge whether or not to use the unlicensed carrier resource which has been occupied by the UE when the UE actively reports that the local Scell of the UE is idle, that is, the eNB does not actively execute a process of judging whether the local Scell of the eNB is idle or not. By such a solution, the problem of relatively large resource waste and data packet delay caused by the fact that the eNB/UE may need to perform conflict probe and feedback loopback for many times and the eNB may need to reserve and occupy a local unlicensed carrier channel resource for a long time during conflict probe loopback is solved. In addition, unnecessary resource overhead is avoided, and the data packet scheduling delay is also reduced.

It may be appreciated that whether or not to use the unlicensed carrier resource which has been occupied by the UE may be judged according to other internal information of the eNB, such as a scheduling strategy and a cached amount of data to be sent, besides the detection result, during implementation the solution of act S1206 in the exemplary embodiment of the disclosure.

For the solution that the eNB receives the indication information reported by the UE in act S1202, there may be many implementation modes. In the exemplary embodiment of the disclosure, the following solutions may be adopted for implementation. (1) The eNB receives specified PUCCH resource information reported by the UE, and the specified PUCCH resource information carries the indication information. (2) The eNB receives CSI reported by the UE, and when the CSI is a preset value, the preset value serves as the indication information. (3) The eNB receives a pseudo ACK sequence, reported by the UE, of a DL pseudo data block of the Scell of the UE, and the pseudo ACK sequence carries the indication information. The solutions (1)-(3) may be independently used and may also be combined for use according to a practical condition, which will not be limited in the exemplary embodiment of the disclosure. The condition (1) may be implemented through the solution that the eNB receives UCI reported by the UE, and a control domain byte of the UCI carries the indication information.

In an exemplary embodiment of the disclosure, the solution of act S1206 may be implemented by the following acts. When the detection result indicates that the local Scell of the eNB is idle, it may be judged that the UE continues occupying the unlicensed carrier resource. When the detection result indicates that the local Scell of the eNB is not idle, it may be judged that the UE releases the unlicensed carrier resource which the UE previously occupies. After the act that it is judged that the UE releases the occupied unlicensed carrier resource, the method may further includes the following act. The eNB sends DCI carrying a dedicated control domain byte to the UE, and the UE releases the unlicensed carrier resource which the UE previously occupies under indication of the DCI, that is, a new control domain byte (equivalent to the dedicated control domain byte of the exemplary embodiment) may be set in the DCI to indicate releasing of the unlicensed carrier resource which is occupied by the UE before.

Figure 13:
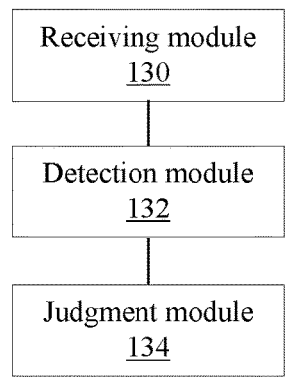
FIG. 13 is a structure block diagram of a device for using an unlicensed carrier resource according to an exemplary embodiment of the disclosure.

An exemplary embodiment further provides a device for using an unlicensed carrier resource, which is applied to an eNB and configured to implement the abovementioned exemplary embodiment and exemplary implementation modes, and what has been described will not be elaborated. Modules involved in the device will be described below. For example, term "module", used below, may be a combination of software and/or hardware capable of realizing a preset function. Although the device described in the following exemplary embodiment may be preferably implemented with software, implementation with hardware or a combination of the software and the hardware is also possible and conceivable. FIG. 13 is a structure block diagram of a device for using an unlicensed carrier resource according to an exemplary embodiment of the disclosure, including: a receiving module 130, a detection module 132 and a judgment module 134.

The receiving module 130 is configured to receive indication information reported by a UE, and the indication information is used for indicating that a local Scell of the UE is idle.

The detection module 132 is configured to, upon a trigger of the indication information, detect whether a local Scell of the eNB is idle or not.

The judgment module 134 is configured to judge, according to a detection result, whether or not to use an unlicensed carrier resource which has been occupied by the UE.

By combined action of each of the modules, the eNB judges whether the local Scell of the eNB is idle or not to further judge whether or not to use the unlicensed carrier resource which has been occupied by the UE when the UE actively reports that the local Scell of the UE is idle, that is, the eNB does not actively execute a process of judging whether the local Scell of the eNB is idle or not. By such a solution, the problem of relatively large resource waste and data packet delay caused by the fact that the eNB/UE may need to perform conflict probe and feedback loopback for many times and the eNB may need to reserve and occupy a local unlicensed carrier channel resource for a long time during conflict probe loopback is solved. In addition, unnecessary resource overhead is avoided, and the data packet scheduling delay is also reduced.

The receiving module 130 may be further configured to receive specified PUCCH resource information reported by the UE, where the specified PUCCH resource information carries the indication information; and/or receive CSI reported by the UE, where when the CSI is a preset value, the preset value serves as the indication information; and/or receive a pseudo ACK sequence, reported by the UE, of a DL pseudo data block of the Scell of the UE, where the pseudo ACK sequence carries the indication information. In an exemplary embodiment of the disclosure, the receiving module 130 may further be configured to receive UCI reported by the UE, and the UCI includes a control domain byte dedicated to carrying the indication information.

Figure 14:
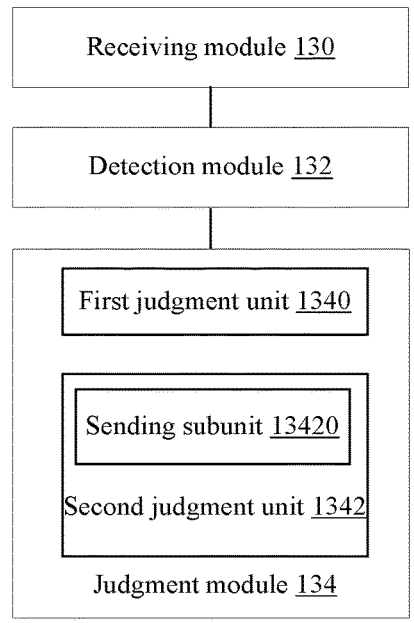
FIG. 14 is another structure block diagram of a device for using an unlicensed resource carrier according to an exemplary embodiment of the disclosure.

In an exemplary embodiment, FIG. 14 is another structure block diagram of a device for using an unlicensed carrier resource according to an exemplary embodiment of the disclosure. As shown in FIG. 14, the judgment module 134 may include a first judgment unit 1340 and a second judgment unit 1342. The first judgment unit 1340 is configured to, when the detection result indicates that the local Scell of the eNB is idle, judge that the UE continues occupying the unlicensed carrier resource. The second judgment unit 1342 is configured to, when the detection result indicates that the local Scell of the eNB is not idle, judge that the UE releases the unlicensed carrier resource which the UE previously occupies.

It may be appreciated that the second judgment unit 1342 includes a sending subunit 13420, which is configured to send DCI carrying a dedicated control domain byte to the UE, and the UE releases, under indication of the DCI carrying the dedicated control domain byte, the unlicensed carrier resource which the UE previously occupies.

Figure 15:
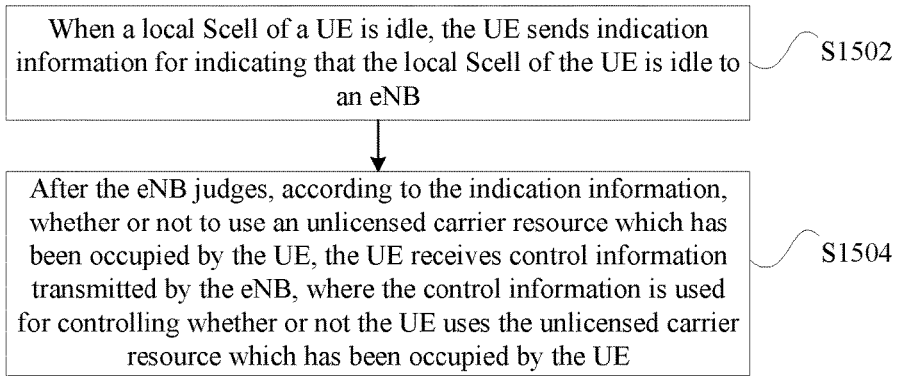
FIG. 15 is another flowchart of a method for using an unlicensed resource carrier according to an exemplary embodiment of the disclosure.

In order to improve an implementation process of the solution, an exemplary embodiment of the disclosure further provides a method for using an unlicensed carrier resource. FIG. 15 is another flowchart of a method for using an unlicensed carrier resource according to an exemplary embodiment of the disclosure. As shown in FIG. 15, the method includes the following acts.

At act S1502, when a local Scell of a UE is idle, the UE sends indication information for indicating that the local Scell of the UE is idle to an eNB.

At act S1504, after the eNB judges, according to the indication information, whether or not to use an unlicensed carrier resource which has been occupied by the UE, the UE receives control information transmitted by the eNB. The control information may be used for controlling whether or not the UE uses the unlicensed carrier resource which has been occupied by the UE.

By the abovementioned acts, whether or not to use the unlicensed carrier resource which has been occupied by the UE is judged according to a detection result transmitted by the eNB after the eNB detects whether the local Scell of the eNB is idle or not when the UE actively reports that the local Scell of the UE is idle, that is, the eNB does not actively execute a process of judging whether the local Scell of the eNB is idle or not. By such a solution, the problem of relatively large resource waste and data packet delay caused by the fact that the eNB/UE may need to perform conflict probe and feedback loopback for many times and the eNB may need to reserve and occupy a local unlicensed carrier channel resource for a long time during conflict probe loopback is solved. In addition, unnecessary resource overhead is avoided, and the data packet scheduling delay is also reduced.

In an exemplary embodiment, the solution of act S1502 may be implemented in at least one of the following implementations. (1) The UE sends specified PUCCH resource information to the eNB, and the specified PUCCH resource information carries the indication information. In an exemplary embodiment of the disclosure, the UE may send UCI to the eNB, and a specified control domain byte of the UCI carries the indication information. (2) The UE sends CSI to the eNB, and when the CSI is a preset value, the preset value serves as the indication information. (3) The UE sends a pseudo ACK sequence of a DL pseudo data block of the Scell of the UE to the eNB, and the pseudo AC sequence carries the indication information. The above implementations (1)-(3) are only adopted as exemplary embodiments of the disclosure, and (1)-(3) may be independently used, and may also be combined for use according to a practical condition.

When the UE sends the indication information for indicating that the local Scell of the UE is idle to the eNB, the UE may send a reserve signal which indicates that the UE is currently occupying the unlicensed carrier resource. In this way, the unlicensed carrier resource is prevented from being occupied by other UE or node.

The exemplary embodiment of the disclosure also provides the following solution. The UE sends, in the local Scell of the UE, a PUSCH data block which is controlled by no UL scheduling information of the eNB, and demodulation information used for the eNB to demodulate the PUSCH data block is fed back to the eNB through a PUCCH of a licensed carrier.

The process of using the unlicensed carrier resource will be explained below with reference to two examples, which are used for illustration only and are not intended to limit the exemplary embodiments of the disclosure.

At act S0, initialization is performed. This act is an act suggested to be completed in both the examples, that is, both an eNB and a UE have a capability of performing CA on an unlicensed carrier. The eNB may provide a configuration, i.e. at least one Pcell (equivalent to the Pcell of the exemplary embodiment) on a licensed carrier and one or more U-Scells(i), for certain LTE unlicensed CA for a specific UE served by it by early wide scanning and monitoring detection over a target unlicensed band, where i is an index number of an unlicensed carrier. It is subsequently supposed that there is only one U-Scell, and for simplifying related descriptions, the index i is removed. A flow will be explained below based on two basic configurations. In a first configuration, the U-Scell is a purely DL Frequency Division Duplex (FDD) frame format cell, i.e. an Unlicensed-Supplementary Downlink (U-SDL) working mode condition. In a second configuration, the U-Scell is a UL and DL Time Division Duplex (TDD) frame format cell, i.e. an Unlicensed-Uplink Downlink (U-UL/DL) working mode condition.

1. For the U-SDL working mode condition, the acts after act S0 are described below.

At act S1, for the specific UE, even though the eNB has yet not performed DL CCA detection and unlicensed channel resource preemption on the U-Scell, the UE is also suggested to periodically execute local CCA detection on the U-Scell even though DL data block scheduling has yet not been performed for the UE (for example, there is yet no DL scheduling information about the U-Scell for the UE on a PDCCH on the licensed carrier). When it is detected by CCA detection that a local U-Scell is idle at a certain time, a feedback is given to the eNB through a PUCCH on the licensed carrier to notify the eNB that the receiving UE currently has no conflict and has gotten ready to receive a DL data block. If the sending eNB has DL data, the sending eNB may perform scheduling sending. Meanwhile, the UE is also suggested to locally send a reserve signal to prevent the unlicensed channel resource of the receiving party from being preempted by another node.

Figure 16:
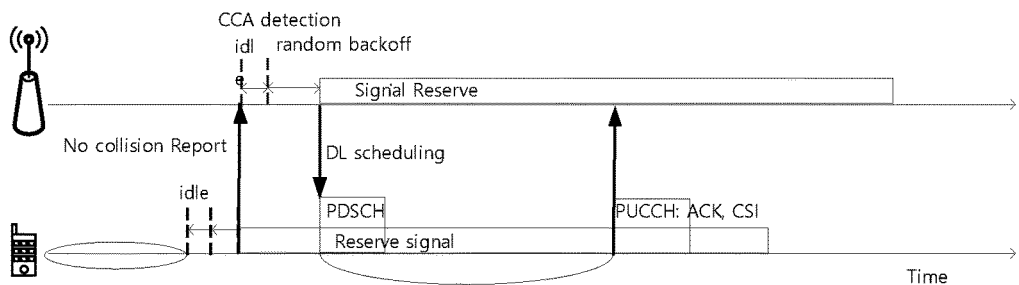
FIG. 16 is a schematic diagram of successful CCA of an eNB according to an exemplary embodiment of the disclosure.
Figure 17:
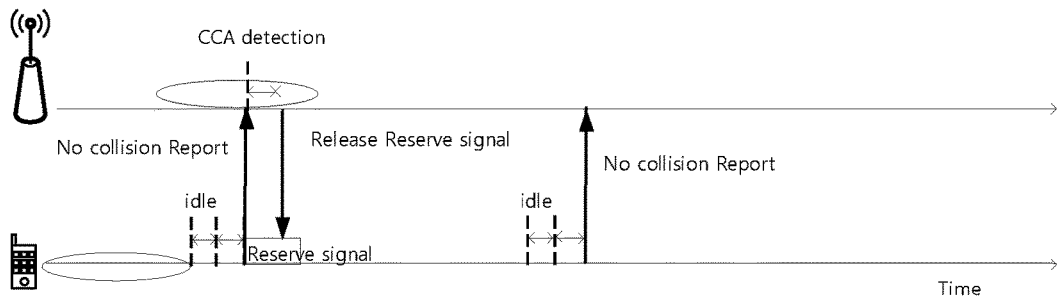
FIG. 17 is a schematic diagram of failed CCA of an eNB according to an exemplary embodiment of the disclosure.

At act S2, the eNB executes local CCA DL detection on the U-Scell immediately after receiving a related information indication in the feedback given through the PUCCH. If it is detected by CCA detection that a local U-Scell resource is idle, the eNB may immediately preempt the unlicensed channel resource on the U-Scell, and may subsequently perform PDCCH DL scheduling and PDSCH data block sending in a time window of a preempted COT, as shown in FIG. 16. If it is detected by CCA detection that the local U-Scell resource is not idle, the eNB may not preempt the unlicensed channel resource on the U-Scell, and may immediately notify the UE through a PDCCH command on the licensed carrier; and the UE may immediately stop sending the local reserve signal and release the unlicensed carrier channel resource, as shown in FIG. 17.

At act S3, if the UE receives related DL scheduling on the PDCCH, the UE normally receives and demodulates a PDSCH data block according to a current LTE technology method. If the UE receives a command indication of stopping sending the local reserve signal on the PDCCH, the UE immediately releases the unlicensed channel resource locally reserved and occupied on the U-Scell, and returns to S1 for UE-side local conflict probe and reporting of a next period.

The abovementioned flow will be further described below.

According to a current LTE PUCCH feedback mechanism, the eNB configures PUCCH resources (a series of Physical Resource Blocks (PRBs)) for the UE. The UE should determine, according to a pilot/interference/DL data block received and demodulated from the sending eNB, a content filled/carried in the PUCCH, such as an ACK/

NACK indicating whether the DL data block is correctly demodulated or not and a part, in the respectively corresponding PUCCH resources, of PUCCH feedback information related to CSI and DL data sending of the Pcell and the U-Scell), and map the content to the specific PRB in a specific PHY coding manner.

The U-Scell and the Pcell may not synchronously perform DL scheduling and data block sending all the time (dependent on a preemption result of the unlicensed channel resource on the U-Scell), so that the PUCCH feedback information related to DL data sending of the U-Scell does not exist all the time (there may be no ACK/NACK and CSI information corresponding to a DL of the U-Scell), and the corresponding PUCCH resources may be utilized for feeding back some other auxiliary information on a UE side. In the exemplary embodiment of the disclosure, the UE is allowed to feed back a no-conflict indication on the UE side by virtue of the idle PUCCH resources. The no-conflict indication fed back to the eNB on the PUCCH may be expressed by introducing a new control domain byte, and may also be expressed by virtue of existing CSI of a current LTE technology. For example, a specific CSI value may be adopted to represent that the receiving UE has no conflict, and based on such a specific CSI value, an eNB side may start trying to perform CAA and DL unlicensed channel resource preemption on the U-Scell, otherwise does not actively perform preemption. An existing mapping manner and sending manner for the PUCCH resources are not changed due to the new content in the exemplary embodiment of the disclosure, and only bearer meanings of some byte domains are changed.

The no-conflict indication fed back to the eNB on the PUCCH may also be expressed by virtue of existing ACK/NACK information of the current LTE technology. For example, a pseudo ACK sequence (the eNB has actually yet not performed DL data packet scheduling sending on the UE on the U-Scell, so that there should have not been any ACK/NACK information) corresponding to the U-Scell may be adopted to represent that the receiving UE has no conflict. Based on the pseudo ACK sequence, the eNB side starts trying to perform CCA and DL unlicensed channel resource preemption on the U-Scell, otherwise does not actively perform preemption.

According to a current LTE cross-carrier scheduling mechanism, the eNB configures PDCCH resources (a series of specific PRBs) for the UE in advance, and the eNB should determine, according to its own resource scheduling information, a content filled/carried in the PDCCH, such as DCI, resource location information of the PRBs, Modulation Coding Scheme (MCS) information. PDCCH control information related to DL data sending of the Pcell and the U-Scell respectively correspond to a part of resources in the PDCCH resources, and are mapped to the specific PRB in the specific PHY coding manner.

The U-Scell and the Pcell may not synchronously perform DL scheduling and data block sending all the time (dependent on a preemption result of the unlicensed channel resource on the U-Scell), so that PDCCH control information related to DL data sending of the U-Scell does not exist all the time, and the corresponding PDCCH resources may be utilized for sending control information with other meanings on the eNB side. An existing mapping manner and sending manner for the PDCCH resources are not changed due to the new content in the exemplary embodiment of the disclosure, and only bearer meanings of some byte domains are changed.

In the exemplary embodiment of the disclosure, the eNB is allowed to send an indication of commanding the UE to stop sending the local reserve signal by virtue of the idle PDCCH resources. The indication of commanding the UE to stop sending the local reserve signal on the PDCCH may be expressed by introducing a new control domain byte, and may also be expressed by virtue of existing MCS information of the current LTE technology. For example, a specific MCS value may be adopted to represent that the sending eNB has a conflict, and based on such a specific MCS value, a UE side may know that the eNB side is in a conflict state all the time within a short time, and may need to timely release the locally reserved and occupied unlicensed channel resource.

Implementation of the exemplary embodiment of the disclosure achieves the following effects. The sending eNB may not actively perform CCA detection and DL unlicensed channel resource preemption on the U-Scell on the premise of not knowing whether the receiving UE side has a conflict or not, and is triggered to perform CCA detection and DL unlicensed channel resource preemption on the U-Scell after receiving a no-conflict indication reported by at least one UE. That is, CCA detection and DL unlicensed channel resource preemption of the sending eNB are significant only under the condition that at least one receiving UE has no conflict on the U-Scell. Or, in an exemplary embodiment, the eNB may preferably and selectively perform DL scheduling on multiple UEs only when knowing about the multiple UEs, when serving as receiving parties, having no conflict on the U-Scell; if the eNB performs scheduling without knowing this information, even though the eNB preempts the DL resource of the U-Scell, DL data block sending may not be reliably and effectively performed because all UE sides served by the eNB have receiving conflicts. Related new control information introduced into the contents of the exemplary embodiment of the disclosure utilizes specific idle PRBs, configured to the UE by the eNB, on the PDCCH/PUCCH, and may not cause too much additional resource overhead.

2. For the U-UL/DL working mode condition, the acts after act S0 are described below.

A DL method is same as the above condition 1, and the only difference lies in that DL CCA detection and resource preemption of the eNB are limited to a location related to a TDD DL sub-frame. In a UL direction, UL CCA detection and resource preemption corresponding to the UE are performed, and is only limited to a location related to a TDD UL sub-frame. Detailed descriptions will be made below.

At act S1, for the specific UE, even though the receiving eNB has yet not performed UL data block scheduling on the U-Scell (for example, there is yet no UL scheduling information about the U-Scell for the UE on the PDCCH on the licensed carrier), the sending UE is also suggested to periodically execute local CCA detection on the U-Scell. When it is detected by CCA detection that the local U-Scell is idle at a certain time, a feedback is given to the eNB through the PUCCH on the licensed carrier to notify the eNB that the UE serving as the receiving party currently has no conflict and has gotten ready to receive a DL data block and the UE serving as the sending party currently has no conflict and has also gotten ready to send a UL data block. Meanwhile, the UE is also suggested to send the local reserve signal to prevent the local unlicensed channel resource of the receiving party from being preempted by the other node. In an exemplary embodiment, the UE may also try to send a UL PUSCH data block which is controlled by no UL scheduling information of the eNB on the U-Scell, and a related MCS format/PRB location information (configured for demodulation of the receiving eNB) of the UL data block is also fed back to the eNB through the PUCCH on the licensed carrier.

At act S2, the eNB executes local CCA DL detection on the U-Scell immediately after receiving the feedback given through the PUCCH. If it is detected by CCA detection that the local U-Scell resource is idle, the eNB may immediately preempt the unlicensed channel resource on the U-Scell, may subsequently perform PDCCH DL scheduling and PDSCH data block sending in a time window of a preempted COT, and meanwhile, may also perform PDCCH UL scheduling and PUSCH data block receiving. If the UE has tried to send the UL PUSCH data block which is controlled by no UL scheduling information of the eNB on the U-Scell, the eNB demodulates the data block according to the related MCS format/PRB location information fed back through the PUSCCH. If it is detected by CCA detection that the local U-Scell resource is not idle, the eNB may not preempt the unlicensed channel resource on the U-Scell, and may immediately notify the UE through a PDCCH command on the licensed carrier; and the UE may immediately stop sending the local reserve signal and release the unlicensed carrier channel resource. If the UE has tried to send the UL PUSCH data block which is controlled by no UL scheduling information of the eNB on the U-Scell, the eNB drops the data block without demodulation (the data block may have been damaged by local strong interference of the eNB).

At act S3, if the UE receives DL scheduling and/or UL scheduling on the PDCCH, the UE normally receives and demodulates a PDSCH data block and/or sends the PUSCH data block on the U-Scell according to the current LTE technology method. If the UE receives a command indication of stopping sending the local reserve signal on the PDCCH, the UE immediately releases the unlicensed channel resource locally reserved and occupied on the U-Scell, the UE will not try to send the UL PUSCH data block which is controlled by no UL scheduling information of the eNB, and will return to S1 for UE-side local conflict probe and reporting of a next period.

The UE is allowed to try to send the UL PUSCH data block which is controlled by no UL scheduling information of the eNB on the U-Scell, and the related MCS format/PRB location information (configured for demodulation of the receiving eNB) of the UL data block is fed back to the eNB through the PUCCH on the licensed carrier. It also means that the sending UE is allowed to send some PUSCH data blocks on the U-Scell before the receiving eNB formally performs UL scheduling on the UE, and after the eNB formally performs PDCCH UL scheduling on the UE, the UE performs PUSCH data block sending completely according to the UL scheduling information of the eNB.

The exemplary embodiment of the disclosure achieves the following effects. The receiving eNB may not actively perform CCA detection and UL unlicensed channel resource preemption on the U-Scell on the premise of not knowing whether the sending UE side has a conflict or not, and is triggered to perform CCA detection and UL unlicensed channel resource preemption on the U-Scell after receiving a no-conflict indication reported by at least one UE. That is, CCA detection and unlicensed channel resource preemption of the receiving eNB are significant only under the condition that at least one sending UE has no conflict on the U-Scell. Or, in an exemplary embodiment, the eNB may preferably and selectively perform UL scheduling on multiple UEs only when knowing about the multiple UEs, when serving as sending parties, having no conflict on the U-Scell; if the eNB performs scheduling without knowing this information, even though the eNB preempts the UL resource of the U-Scell, UL data block sending may not be reliably and effectively performed because all UE sides served by the eNB have receiving conflicts. Related new control information introduced into the contents of the exemplary embodiment of the disclosure utilizes specific idle PRBs, configured to the UE by the eNB, on the PDCCH/PUCCH, and may not cause too much additional resource overhead.

Figure 18:
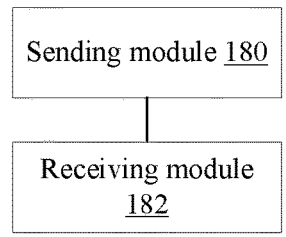
FIG. 18 is another structure block diagram of a device for using an unlicensed carrier resource according to an exemplary embodiment of the disclosure.

An exemplary embodiment further provides a device for using an unlicensed carrier resource, which is applied to a UE and configured to implement the abovementioned exemplary embodiment and exemplary implementation modes, and what has been described will not be elaborated. Modules involved in the device will be described below. For example, term "module", used below, may be a combination of software and/or hardware capable of realizing a preset function. Although the device described in the following exemplary embodiment is preferably implemented with software, implementation with hardware or a combination of the software and the hardware is also possible and conceivable. FIG. 18 is another structure block diagram of a device for using an unlicensed carrier resource according to an exemplary embodiment of the disclosure, including: a sending module 180 and a receiving module 182.

The sending module 180 is configured to, when a local Scell of the UE is idle, send indication information for indicating that the local Scell of the UE is idle to an eNB.

The receiving module 182 is configured to, after the eNB judges, according to the indication information, whether or not to use an unlicensed carrier resource which has been occupied by the UE, receive control information transmitted by the eNB, wherein the control information is used for controlling whether or not the UE uses the unlicensed carrier resource which has been occupied by the UE.

By combined action of each of the modules, whether or not to use the unlicensed carrier resource which has been occupied by the UE is judged according to a detection result transmitted by the eNB after the eNB detects whether the local Scell of the eNB is idle or not when the UE actively reports that the local Scell of the UE is idle, that is, the eNB does not actively execute a process of judging whether the local Scell of the eNB is idle or not. By such a solution, the problem of relatively large resource waste and data packet delay caused by the fact that the eNB/UE may need to perform conflict probe and feedback loopback for many times and the eNB may need to reserve and occupy a local unlicensed carrier channel resource for a long time during conflict probe loopback is solved. In addition, unnecessary resource overhead is avoided, and the data packet scheduling delay is also reduced.

In an exemplary embodiment, the sending module 180 may be configured to send specified PUCCH resource information to the eNB, where the specified PUCCH resource information carries the indication information; and/or send CSI to the eNB, where when the CSI is a preset value, the preset value serves as the indication information; and/or send a pseudo ACK sequence of a DL pseudo data block of the Scell of the UE to the eNB, where the pseudo AC sequence carries the indication information. The sending module 180 may be further configured to send UCI to the eNB, where the UCI includes a control domain byte dedicated to carrying the indication information.

The abovementioned flow of using the unlicensed carrier will be described below in detail with reference to two exemplary embodiments and the FIGS. 19-20.

First Exemplary Embodiment

Figure 19:
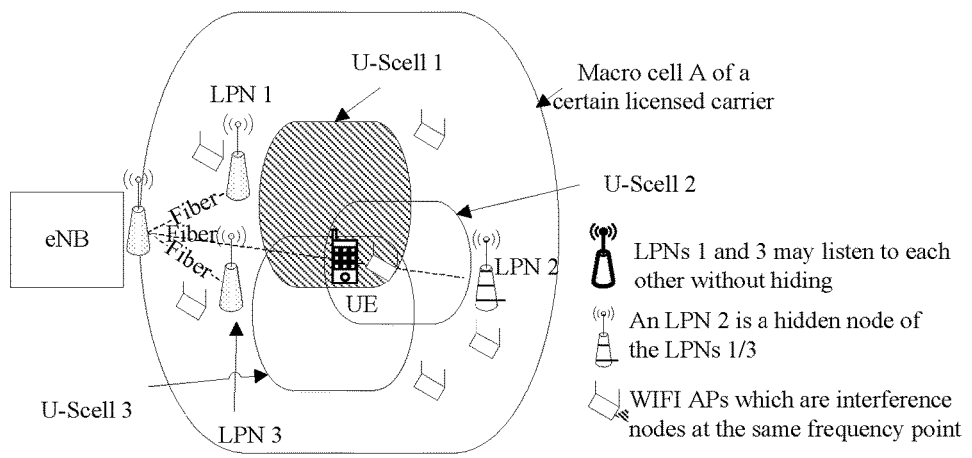
FIG. 19 is a schematic diagram of a system for using an unlicensed carrier resource according to a first exemplary embodiment of the disclosure.

A plurality of unlicensed carrier micro cells U-Scells 1/2/3 at the same frequency point exist under coverage of a macro cell A on a certain licensed carrier of an operating company A, and a plurality of WIFI APs at the same frequency point also exist, and they are deployed as shown in FIG. 19. LPNs 1/3 to which the U-Scells 1 and 3 belong may listen to each other without a hiding relationship, and an LPN 2 to which the U-Scell 2 belongs is a hidden node of the LPNs 1/3, and may produce strong interference to a UE 1. An eNB determines that the U-Scell 1 in a CA configuration for the UE 1 is in a U-SDL working mode by early wide scanning and monitoring detection over a target unlicensed band 5,150 MHz-5,350 MHz, and its working frequency point range is selected to be a 10 M bandwidth of 5,160 MHz-5,170 MHz. According to the solution of the exemplary embodiment of the disclosure, although the U-Scell 1 is configured and activated, the eNB/LPN 1 may not actively perform DL CCA detection and unlicensed channel resource preemption on the U-Scell 1.

At an act S101, for the UE 1, even though the eNB/LPN 1 has yet not performed DL CCA detection and unlicensed channel resource preemption on the U-Scell 1, the UE 1 is also suggested to periodically execute local CCA detection on the U-Scell 1 even though DL data block scheduling has yet not been performed for the UE (for example, there is yet no DL scheduling information about the U-Scell 1 for the UE 1 on a PDCCH on the macro cell A). When it is detected by CCA detection that the local U-Scell 1 is idle at a certain time, a feedback is given to the eNB/LPN 1 through a PUCCH on the macro cell A to notify the eNB/LPN 1 that the receiving UE 1 currently has no conflict and has gotten ready to receive a DL data block. If the sending eNB/LPN1 has DL data, the sending eNB/LPN 1 may perform scheduling sending. Meanwhile, the UE 1 is also suggested to locally send a reserve signal to prevent an unlicensed channel resource of the receiving party from being preempted by an LPN 3 and surrounding WIFI APs. An expression bearing manner for a no-conflict indication is two continuous pseudo ACK sequences corresponding to a DL pseudo data block of the U-Scell 1 in the PUCCH.

At an act S102, the eNB/LPN 1 executes local CCA DL detection on the U-Scell 1 immediately after receiving a related information indication in the feedback given through the PUCCH. If it is detected by CCA detection that a local U-Scell 1 resource is idle, the LPN 1 may immediately preempt the unlicensed channel resource on the U-Scell 1, and may subsequently perform PDCCH DL scheduling and PDSCH data block sending in a time window of a preempted COT. If it is detected by CCA detection that the local U-Scell 1 resource is not idle (for example, it has been preempted by the LPN 3), the LPN 1 may not preempt the unlicensed channel resource on the U-Scell 1, and may immediately notify the UE through a PDCCH command on the licensed carrier; and the UE may immediately stop sending the local reserve signal and release the unlicensed carrier channel resource. An expression bearing manner for such a command indication is a certain new control byte in DCI corresponding to the U-Scell 1 in the PDCCH.

At an act S103, if the UE 1 receives related DL scheduling on the PDCCH, the UE 1 normally receives and demodulates a PDSCH data block on the U-Scell 1 according to a current LTE technology method. If the UE 1 receives the command indication of stopping sending the local reserve signal on the PDCCH, the UE 1 immediately releases the unlicensed channel resource locally reserved and occupied on the U-Scell 1, and returns to S101 for UE-side local conflict probe and reporting of a next period.

Second Exemplary Embodiment

Figure 20:
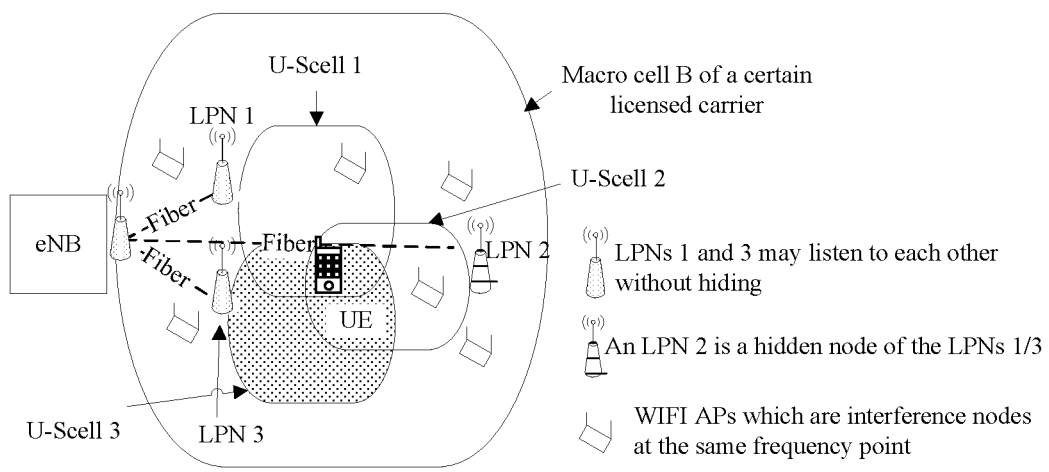
FIG. 20 is a schematic diagram of a system for using an unlicensed carrier resource according to a second exemplary embodiment of the disclosure.

A plurality of unlicensed carrier micro cells U-Scells 1/2/3 at the same frequency point exist under coverage of a macro cell B on a certain licensed carrier of an operating company B, and a plurality of WIFI APs at the same frequency point also exist, and they are deployed as shown in FIG. 20. LPNs 1/3 to which the U-Scells 1 and 3 belong may listen to each other without a hiding relationship, and an LPN 2 to which the U-Scell 2 belongs is a hidden node of the LPNs 1/3, and may produce strong interference to a UE 2. An eNB determines that the U-Scell 3 in a CA configuration for the UE 2 is in a U-UL/DL working mode by early wide scanning and monitoring detection over a target unlicensed band 5,150 MHz-5,350 MHz, and its working frequency point range is selected to be a 10 M bandwidth of 5,260 MHz-5,280 MHz. According to the solution of the exemplary embodiment of the disclosure, although the U-Scell 3 is configured and activated, the eNB/LPN 3 may not actively perform DL CCA detection and unlicensed channel resource preemption on the U-Scell 3.

At an act S201, for the UE 2, even though the receiving eNB/LPN 3 has yet not performed DL CCA detection and unlicensed channel resource preemption on the U-Scell 3, the UE 2 is also suggested to periodically execute local CCA detection on the U-Scell 3 even though DL data block scheduling has yet not been performed for the UE (for example, there is yet no DL scheduling information about the U-Scell 3 for the UE 2 on a PDCCH on the licensed carrier). When it is detected by CCA detection that the local U-Scell 3 is idle at a certain time, a feedback is given to the eNB/LPN 3 through a PUCCH on the macro cell B to notify the eNB/LPN 3 that the receiving UE 2 currently has no conflict and has gotten ready to receive a DL data block. If the sending eNB/LPN3 has DL data, the sending eNB/LPN 3 may perform scheduling sending. Meanwhile, the UE 2 serving as the sending party currently has no conflict, has also gotten ready to send a UL data block, and requests the receiving eNB/LPN 3 to get ready for UL data scheduling and receiving. Meanwhile, the UE 2 is also suggested to send a local reserve signal to prevent a local unlicensed channel resource of the receiving party from being preempted by the LPN 1 and the surrounding WIFI APs. An expression bearing manner for a no-conflict indication is a certain new control byte defined by UCI in a PUCCH. In the second exemplary embodiment, the UE 2 does not try to send a UL PUSCH data block which is controlled by no UL scheduling information of the eNB/LPN 3 on the U-Scell 3, so that a related MCS format/PRB location information for UL sending is not required.

At an act S202, the eNB/LPN 3 executes local CCA DL detection on the U-Scell 3 immediately after receiving the related information indication in the feedback given through the PUCCH. If it is detected by CCA detection that the local U-Scell 3 resource is idle, the LPN 3 may immediately preempt the unlicensed channel resource on the U-Scell 3, may subsequently perform PDCCH DL scheduling and PDSCH data block sending in a time window of a preempted COT, and meanwhile, may also perform PDCCH UL scheduling and PUSCH data block receiving. If it is detected by CCA detection that the local U-Scell 3 resource is not idle (for example, it has been preempted by the LPN 1), the LPN 3 may not preempt the unlicensed channel resource on the U-Scell 3, and may immediately notify the UE 2 through a PDCCH command on the macro cell B; and the UE may immediately stop sending the local reserve signal and release the unlicensed carrier channel resource. An expression bearing manner for such a command indication is a certain new control byte in the DCI corresponding to the U-Scell 3 in the PDCCH.

At an act S203, if the UE 2 receives DL scheduling and/or UL scheduling on the PDCCH, the UE 2 normally receives and demodulates a PDSCH data block and/or sends the PUSCH data block on the U-Scell 3 according to the current LTE technology method. If the UE 2 receives the command indication of stopping sending the local reserve signal on the PDCCH, the UE 2 immediately releases the unlicensed channel resource locally reserved and occupied on the U-Scell 3, and returns to S201 for UE-side local conflict probe and reporting of a next period.

Another exemplary embodiment further provides software, which is configured to execute the solutions described in the abovementioned exemplary embodiments and exemplary implementation modes.

Another exemplary embodiment further provides a storage medium, in which the abovementioned software is stored, the storage medium including, but not limited to: an optical disk, a floppy disk, a hard disk, an erasable memory and the like.

From the above, some exemplary embodiments of the disclosure have the following effects. The problem of relatively large resource waste and data packet delay caused by the fact that the eNB/UE may need to perform conflict probe and feedback loopback for many times and the eNB may need to reserve and occupy a local unlicensed carrier channel resource for a long time during conflict probe loopback is solved. In addition, unnecessary resource overhead is avoided, and the data packet scheduling delay is also reduced.

INDUSTRIAL APPLICABILITY

From the above description, it can be seen that the solution that the eNB judges whether the local Scell of the eNB is idle or not to further judge whether or not to use the unlicensed carrier resource which has been occupied by the UE when the UE actively reports that the local Scell of the UE is idle is adopted in the exemplary embodiments of the disclosure, that is, the eNB does not actively execute the process of judging whether the local Scell of the eNB is idle or not. By such a solution, the problem of relatively large resource waste and data packet delay caused by the fact that the eNB/UE may need to perform conflict probe and feedback loopback for many times and the eNB may need to reserve and occupy a local unlicensed carrier channel resource for a long time during conflict probe loopback is solved. In addition, unnecessary resource overhead is avoided, and the data packet scheduling delay is also reduced.

Obviously, those skilled in the art should know that each module or each act of the disclosure may be implemented by a universal computing device, and the modules or acts may be concentrated on a single computing device or distributed on a network formed by a plurality of computing devices, and may optionally be implemented by program codes executable for the computing devices, so that the modules or acts may be stored in a storage device for execution with the computing devices, the shown or described acts may be executed in sequences different from those described here in some circumstances, or may form each integrated circuit module respectively, or multiple modules or acts therein may form a single integrated circuit module for implementation. As a consequence, the disclosure is not limited to any specific hardware and software combination.

The above is only the exemplary embodiment of the disclosure and not intended to limit the scope of protection of the disclosure. For those skilled in the art, the disclosure may have various modifications and variations. Any modifications, equivalent replacements, improvements and the like made within the principle of the disclosure shall fall within the scope of protection defined by the appended claims of the disclosure.

What is claimed is:

1. A method for using an unlicensed carrier resource, comprising:
   receiving, by an eNode B (eNB), indication information reported by a User Equipment (UE), wherein the indication information is used for indicating that a local Secondary Cell (Scell) of the UE is idle;
   detecting, by the eNB upon a trigger of the indication information, whether a local Scell of the eNB is idle or not; and
   judging, by the eNB according to a detection result of detecting whether the local Scell of the eNB is idle or not, whether or not to use an unlicensed carrier resource which has been occupied by the UE
   receiving, by the UE, control information transmitted by the eNB, wherein the control information is used for controlling whether or not the UE uses the unlicensed carrier resource which has been occupied by the UE;
   sending in the local Scell of the UE, by the UE, a Physical Uplink Shared Channel (PUSCH) data block which is controlled by no Uplink (UL) scheduling information of the eNB, wherein demodulation information used for the eNB to demodulate the PUSCH data block is fed back to the eNB through a Physical Uplink Control Channel (PUCCH) of a licensed carrier.

2. The method as claimed in claim 1, wherein receiving, by the eNB, the indication information reported by the UE comprises at least one of:
   receiving, by the eNB, specified PUCCH resource information reported by the UE, wherein the specified PUCCH resource information carries the indication information;
   receiving, by the eNB, Channel State Information (CSI) reported by the UE, wherein, when the CSI is a preset value, the preset value serves as the indication information; and receiving, by the eNB, a pseudo Acknowledgement (ACK) sequence, reported by the UE, of a Downlink (DL) pseudo data block of the Scell of the UE, wherein the pseudo ACK sequence carries the indication information.

3. The method as claimed in claim 2, wherein receiving, by the eNB, the specified PUCCH resource information reported by the UE comprises:
   receiving, by the eNB, Uplink Control Information (UCI) reported by the UE, wherein the UCI comprises a control domain byte dedicated to carrying the indication information.

4. The method as claimed in claim 1, wherein judging, by the eNB according to the detection result of detecting whether the local Scell of the eNB is idle or not, whether or not to use the unlicensed carrier resource which has been occupied by the UE comprises:
   when the detection result of detecting whether the local Scell of the eNB is idle or not indicates that the local Scell of the eNB is idle, judging that the UE continues occupying the unlicensed carrier resource; and
   when the detection result of detecting whether the local Scell of the eNB is idle or not indicates that the local Scell of the eNB Is not idle, judging that the UE releases the unlicensed carrier resource which the UE previously occupies.

5. The method as claimed in claim 4, after judging that the UE releases the unlicensed carrier resource which the UE previously occupies, further comprising:
sending, by the eNB, Downlink Control Information (DCI) carrying a dedicated control domain byte to the UE, wherein the UE releases, under indication of the DCI carrying the dedicated control domain byte, the unlicensed carrier resource which the UE previously occupies.

6. A method for using an unlicensed carrier resource, comprising:
when a local Secondary Cell (Scell) of a User Equipment (UE) is idle, sending, by the UE, indication information for Indicating that the local Scell of the UE is idle to an eNode B (eNB); and
after the eNB judges, according to the indication information, whether or not to use an unlicensed carrier resource which has been occupied by the UE, receiving, by the UE, control information transmitted by the eNB, wherein the control information is used for controlling whether or not the UE uses the unlicensed carrier resource which has been occupied by the UE; sending in the local Scell of the UE, by the UE, a Physical Uplink Shared Channel (PUSCH) data block which is controlled by no Uplink (UL) scheduling information of the eNB, wherein demodulation information used for the eNB to demodulate the PUSCH data block is fed back to the eNB through a Physical Uplink Control Channel (PUCCH) of a licensed carrier.

7. The method as claimed in claim 6, wherein sending, by the UE, the indication information to the eNB comprises at least one of:
sending, by the UE, specified PUCCH resource information to the eNB, wherein the specified PUCCH resource information carries the indication information;
sending, by the UE, Channel State Information (CSI) to the eNB, wherein, when the CSI is a preset value, the preset value serves as the indication information; and
sending, by the UE, a pseudo Acknowledgement (ACK) sequence of a Downlink (DL) pseudo data block of the Scell of the UE to the eNB, wherein the pseudo AC sequence carries the indication information.

8. The method as claimed in claim 7, wherein sending, by the UE, the specified PUCCH resource information to the eNB comprises:
sending, by the UE, Uplink Control Information (UCI) to the eNB, wherein the UCI comprises a control domain byte dedicated to carrying the indication information.

9. The method as claimed in claim 6, when sending, by the UE, the indication information for indicating that the local Scell of the UE is idle to the eNB, the method further comprising: sending, by the UE, a reserve signal, wherein the reserve signal indicates that the UE is currently occupying the unlicensed carrier resource.

10. A system for using an unlicensed carrier resource, which comprises an eNode B (eNB) and a UE, and the eNB comprising a hardware processor configured to execute program modules comprising:
a receiving module, configured to receive indication information reported by a User Equipment (UE), wherein the indication information is used for indicating that a local Secondary Cell (Scell) of the UE is idle;
a detection module, configured to, upon a trigger of the indication information, detect whether a local Scell of the eNB is idle or not; and
a judgment module, configured to judge, according to a detection result of detecting whether the local Scell of the eNB is idle or not, whether or not to use an unlicensed carrier resource which has been occupied by the UE;

the UE is configure to receive control information transmitted by the eNB, wherein the control information is used for controlling whether or not the UE uses the unlicensed carrier resource which has been occupied by the UE, and the UE is further configure to send in the local Scell of the UE a Physical Uplink Shared Channel (PUSCH) data block which is controlled by no Uplink (UL) scheduling information of the eNB, wherein demodulation information used for the eNB to demodulate the PUSCH data block is fed back to the eNB through a Physical Uplink Control Channel of a licensed carrier.

11. The device as claimed in claim 10, wherein the receiving module is further configured to execute at least one of followings: receive specified PUCCH resource information reported by the UE, wherein the specified PUCCH resource information carries the indication information:
receive Channel State Information (CSI) reported by the UE, wherein, when the C SI is a preset value, the preset value serves as the indication information;
receive a pseudo Acknowledgement (ACK) sequence, reported by the UE, of a Downlink (DL) pseudo data block of the Scell of the UE, wherein the pseudo ACK sequence carries the indication information.

12. The device as claimed in claim 11, wherein the receiving module is further configured to receive Uplink Control Information (UCI) reported by the UE, wherein the UCI comprises a control domain byte dedicated to carrying the indication information.

13. The device as claimed in claim 10, wherein the judgment module comprises:
a first judgment unit, configured to, when the detection result of detecting whether the local Scell of the eNB is idle or not indicates that the local Scell of the eNB is idle, judge that the UE continues occupying the unlicensed carrier resource; and
a second judgment unit, configured to, when the detection result of detecting whether the local Scell of the eNB is idle or not indicates that the local Scell of the eNB is not idle, judge that the UE releases the unlicensed carrier resource which the UE previously occupies.

14. The device as claimed in claim 13, wherein the second judgment unit comprises:
a sending subunit, configured to send Downlink Control Information (DCI) carrying a dedicated control domain byte to the UE, wherein the UE releases, under indication of the DCI carrying the dedicated control domain byte, the unlicensed carrier resource which the UE previously occupies.

15. A device for using an unlicensed carrier resource, applied to a User Equipment (UE) and comprising a hardware processor configured to execute program modules comprising:
a sending module, configured to, when a local Secondary Cell (Scell) of the UE is idle, send indication information for indicating that the local Scell of the UE is idle to an eNode B (eNB); and
a receiving module, configured to, after the eNB judges according to the indication information whether or not to use an unlicensed carrier resource which has been occupied by the UE, receive control information transmitted by the eNB, wherein the control information is used for controlling whether or not the UE uses the unlicensed carrier resource which has been occupied by the UE;
the hardware processor is further configured to send in the local Scell of the UE a Physical Uplink Shared Channel (PUSCED data block which is controlled by no Uplink (UL) scheduling information of the eNB, wherein demodulation information used for the eNB to demodulate the PUSCH data block is fed back to the eNB through a Physical Uplink Control Channel (PUCCH) of a licensed carrier.

16. The device as claimed in claim 15, wherein the sending module is configured to execute at least one of followings:

send specified PUCCH resource information to the eNB, wherein the specified PUCCH resource information carries the indication information;

send Channel State Information (CSI) to the eNB, wherein, when the CSI is a preset value, the preset value serves as the indication Information:

send a pseudo Acknowledgement (ACK) sequence of a Downlink (DL) pseudo data block of the Scell of the UE to the eNB, wherein the pseudo AC sequence carries the indication information.

17. The device as claimed in claim 16, wherein the sending module is further configured to send Uplink Control Information (UCI) to the eNB, wherein the UCI comprises a control domain byte dedicated to carrying the indication information.

18. The device as claimed in claim 17, wherein the hardware processor is further configured to, when the sending module sends the indication information for indicating that the local Scell of the UE is idle to the eNB, send a reserve signal, wherein the reserve signal indicates that the UE is currently occupying the unlicensed carrier resource.

* * * * *